(12) United States Patent  
Park et al.

(10) Patent No.: US 8,670,424 B2
(45) Date of Patent: Mar. 11, 2014

(54) METHOD AND APPARATUS FOR DETECTING WHETHER CELL COVERAGE IS DOWNSCALED IN WIRELESS COMMUNICATION SYSTEM

(75) Inventors: Young-Jun Park, Seoul (KR); Mi-Sun Do, Suwon-si (KR); Ki-Young Han, Yongin-si (KR); Sang-Hoon Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 626 days.

(21) Appl. No.: 13/009,106

(22) Filed: Jan. 19, 2011

(65) Prior Publication Data

US 2011/0176525 A1    Jul. 21, 2011

(30) Foreign Application Priority Data

Jan. 19, 2010    (KR) .................... 10-2010-0004959

(51) Int. Cl.
    *H04Q 7/24*    (2006.01)
(52) U.S. Cl.
    USPC ....................................................... 370/338
(58) Field of Classification Search
    None
    See application file for complete search history.

(56) References Cited

U.S. PATENT DOCUMENTS

| | | | |
|---|---|---|---|
| 5,548,812 A * | 8/1996 | Padovani et al. ............... 455/442 |
| 5,802,173 A * | 9/1998 | Hamilton-Piercy et al. . 379/56.2 |
| 6,549,531 B1 * | 4/2003 | Charas ........................... 370/347 |
| 7,142,861 B2 * | 11/2006 | Murai ............................ 455/444 |
| 7,499,700 B2 * | 3/2009 | Dillon et al. ................... 455/423 |
| 8,045,996 B2 * | 10/2011 | Brunner et al. ............. 455/456.1 |
| 8,219,096 B2 * | 7/2012 | Wu et al. ........................ 455/436 |
| 8,301,149 B2 * | 10/2012 | del Rio Romero et al. ... 455/443 |
| 2002/0187784 A1 * | 12/2002 | Tigerstedt et al. ............ 455/439 |
| 2003/0169700 A1 * | 9/2003 | Nilsson ......................... 370/318 |
| 2004/0242257 A1 * | 12/2004 | Valkealahti et al. .......... 455/522 |
| 2005/0085254 A1 * | 4/2005 | Chuah et al. .................. 455/522 |
| 2007/0218949 A1 * | 9/2007 | Cleveland ..................... 455/561 |
| 2007/0225000 A1 * | 9/2007 | Cleveland ..................... 455/446 |
| 2007/0238414 A1 * | 10/2007 | Cleveland et al. ........... 455/63.1 |
| 2008/0096566 A1 * | 4/2008 | Brunner et al. ............... 455/437 |
| 2009/0154426 A1 * | 6/2009 | Perraud et al. ................ 370/332 |
| 2010/0273500 A1 * | 10/2010 | Dominguez Romero et al. .......................... 455/452.2 |
| 2012/0039166 A1 * | 2/2012 | Gao ............................... 370/221 |
| 2012/0142382 A1 * | 6/2012 | Stanforth et al. ............. 455/500 |

* cited by examiner

*Primary Examiner* — Hassan Phillips
*Assistant Examiner* — Prenell Jones

(57) ABSTRACT

A wireless communication system includes an apparatus capable of detecting whether a cell coverage is downscaled. The wireless communication system receives information used for communication between an evolved NodeB (eNodeB) and a User Equipment (UE) from the eNodeB. The UE performs at least one of pilot signal power checking for checking if a pilot signal power falls within a first reference range, DownLink (DL) Signal-to-Interference plus Noise Ratio (SINR) checking for checking if an SINR of a DL traffic channel falls within a second reference range, and UpLink (UL) SINR checking for checking if an SINR of an UL traffic channel falls within a third reference range using the received information. The UE also detects whether a cell coverage of a cell to which the eNodeB and the UE belongs is downscaled based on a checking result.

28 Claims, 5 Drawing Sheets

METHOD AND APPARATUS FOR DETECTING WHETHER CELL COVERAGE IS DOWNSCALED IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 19, 2010 and assigned Serial No. 10-2010-0004959, the entire disclosure of which is hereby incorporated by reference.

TECHNICAL FIELD OF THE INVENTION

The present invention relates to a method and apparatus for detecting whether a cell coverage is downscaled in a wireless communication system.

BACKGROUND OF THE INVENTION

A cell coverage indicates a range where communication between an evolved NodeB (eNodeB) and a User Equipment (UE) is valid in a wireless communication system. Thus, when the cell coverage is smaller than a reference coverage, that is, the cell coverage is downscaled, a problem occurs in communication between a cell transceiver in charge of a corresponding cell and the UE. Accordingly, there is a need for a method for accurately detecting whether the cell coverage is downscaled. Meanwhile, the reference coverage indicates a range of an area where the UE can receive a signal transmitted from the eNodeB when the eNodeB transmits the signal with the maximum strength.

In a conventional wireless communication system, a direct method or indirect method has been used to detect whether the cell coverage is downscaled.

The direct method checks a strength of a signal received by a UE from an eNodeB through a drive test and determines that a cell coverage is downscaled if the checked strength of the signal is lower than a preset threshold value.

The indirect method measures service qualities of UEs included in a particular cell and determines that a cell coverage is downscaled if the measured service quality is continuously lower than a preset threshold value.

However, when whether or not the cell coverage is downscaled is detected by using either the direct method or indirect method, the following problems occur:

First, the direct method cannot collect various data for a plurality of cells because exclusive manpower and equipment for the drive test are required. Generally, to check a state of a cell coverage of the entire mobile communication network, a time of several weeks through several months is required, increasing cost corresponding to the man power.

Moreover, when Radio Frequency (RF) setting of a cell is changed to adjust a cell coverage, the drive test has to be performed first on the cell to check if the adjusted cell coverage is valid. In this case, the aforementioned problems are also caused by the drive test.

The change of RF setting of a single cell also affects a wireless environment of an adjacent cell. As a result, when cell coverage adjustment is performed dynamically, the number of times the drive test is performed may increase sharply. Therefore, when the direct method is used, a scheme to minimize the number of times the drive test is performed is required.

In the meantime, the indirect method, because of using service qualities of UEs, may not accurately detect whether a cell coverage is downscaled. This is because the service qualities of the UEs may be degraded by several factors as well as the downscaling of the cell coverage and may be affected by a combination of various factors.

Moreover, since the service quality changes based on statistics corresponding to a periodic calculation result of a downlink error rate, a time for data collection is additionally required to reliably detect whether the cell coverage is downscaled. Accordingly, the indirect method cannot immediately handle a case where the cell coverage is downscaled.

SUMMARY OF THE INVENTION

To address the above-discussed deficiencies of the prior art, it is a primary object to provide a method and apparatus for detecting whether a cell coverage is downscaled in a wireless communication system.

An aspect of the present invention is to provide a method and apparatus for detecting whether a cell coverage is downscaled based on wireless environment and channel information collected from a UE and an eNodeB in a wireless communication system.

In addition, another aspect of the present invention is to provide a method and apparatus for rapidly and accurately detecting whether a cell coverage is downscaled at low cost in a wireless communication system.

According to an aspect of the present invention, there is provided a method for detecting whether a cell coverage is downscaled in a wireless communication system. The method includes receiving information used for communication between an evolved NodeB (eNodeB) and a User Equipment (UE) from the eNodeB, the information being acquired by the eNodeB and the UE; performing, by using the received information, at least one of pilot signal power checking for checking if a pilot signal power falls within a first reference range; DownLink (DL) Signal-to-Interference plus Noise Ratio (SINR) checking for checking if an SINR of a DL traffic channel falls within a second reference range; and UpLink (UL) SINR checking for checking if an SINR of an UL traffic channel falls within a third reference range, and detecting whether a cell coverage of a cell to which the eNodeB and the UE belongs is downscaled, based on a checking result according to at least one of the pilot signal power checking, the DL SINR checking, the UL SINR checking.

According to another aspect of the present invention, there is provided an apparatus that detects whether a cell coverage is downscaled in a wireless communication system. The apparatus includes a pilot power checking unit that, upon receiving information used for communication between an evolved NodeB (eNodeB) and a User Equipment (UE) from the eNodeB, the information being acquired by the eNodeB and the UE, checks if a pilot signal power falls within a first reference range by using the information, a DownLink (DL) Signal-to-Interference plus Noise Ratio (SINR) checking unit that checks if an SINR of a DL traffic channel falls within a second reference range by using the information, a UpLink (UL) SINR checking unit that checks if an SINR of an UL traffic channel falls within a third reference range, and a cell coverage downscaling detecting unit that receives a checking result from at least one of the pilot power checking unit, the DL SINR checking unit, and the UL SINR checking unit and detects whether a cell coverage of a cell to which the eNodeB and the UE belongs is downscaled, based on the checking result.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

In the present invention, a description will be made of a method and apparatus for detecting whether a cell coverage is downscaled in a wireless communication system. More specifically, in the present invention, a description will be made regarding a method and apparatus capable of rapidly and accurately detecting whether a cell coverage is downscaled at low cost based on wireless environment and channel information collected by a User Equipment (UE) and an evolved NodeB (eNodeB) in a wireless communication system. Herein, a cell coverage is regarded as being downscaled when the cell coverage is smaller than a reference coverage.

Hereinafter, a wireless communication system according to an embodiment of the present invention will be described with reference to FIG. 1.

Figure 1:
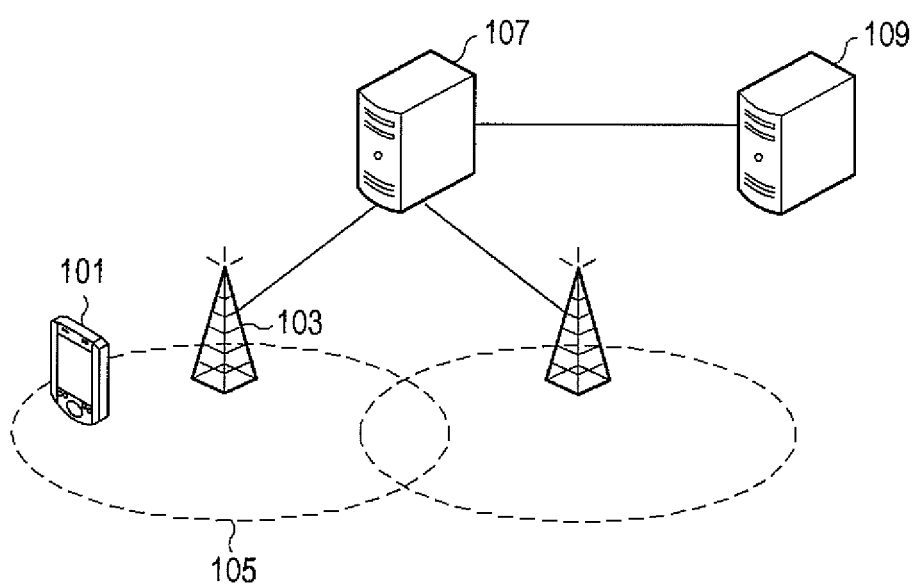
FIG. 1 is a diagram showing a wireless communication system according to an embodiment of the present invention.

FIG. 1 is a diagram showing a wireless communication system according to an embodiment of the present invention.

The wireless communication system includes a UE 101, a cell transceiver 103, an eNodeB 107, and a cell coverage monitoring unit 109.

The UE 101 receives a DownLink (DL) signal from the eNodeB 107, and transmits an UpLink (UL) signal to the eNodeB 107. The UE 101 transmits strength and quality information of the received DL signal (hereinafter, referred to as 'DL signal information') to the eNodeB 107.

The cell transceiver 103 is positioned between the UE 101 and the eNodeB 107 to transmit the DL signal received from the eNodeB 107 to the UE 101 and the UL signal received from the UE 101 to the eNodeB 107. The cell transceiver 103 also transmits strength and quality information of the received UL signal (hereinafter, referred to as 'UL signal information') to the eNodeB 107.

The cell transceiver 103 has a cell coverage 105 for wireless communication with the UE 101. When the cell coverage 105 is not downscaled, that is, the cell coverage 105 is not smaller than the reference coverage, the DL signal transmitted by the cell transceiver 103 is received by the UE 101 with quality higher than a threshold value and the UL signal transmitted from the UE 101 is received by the cell transceiver 103 with quality higher than the threshold value.

However, when the cell coverage 105 is downscaled, the DL signal transmitted from the cell transceiver 103 is received by the UE 101 with quality lower than a threshold value and the UL signal transmitted from the UE 101 is received by the cell transceiver 103 with quality lower than the threshold value.

The eNodeB 107 manages and controls one or more cells. In particular, the eNodeB 107 transmits the DL signal information transmitted from the UE 101 and the UL signal information transmitted from the cell transceiver 103 to the cell coverage monitoring unit 109. The eNodeB 107 transmits setting parameters associated with its current wireless resources and Radio Frequency (RF) setting to the cell coverage monitoring unit 109.

The cell coverage monitoring unit 109 monitors whether a cell coverage of each cell is downscaled. The cell coverage monitoring unit 109 receives the DL signal information and the UL signal information from the eNodeB 107, and monitors and determines whether a cell coverage is downscaled for each cell based on the received DL and UL signal information.

The DL and UL signal information may be classified into three types. In other words, the DL and UL signal information may be classified into periodic data periodically collected from the UE 101 and the eNodeB 107, event-driven data collected from the UE 101 and the eNodeB 107 only upon occurrence of a particular event, and environmental data associated with a current wireless network setting state. The periodic data, the event-driven data, and the environmental data may include information as shown in Table 1.

TABLE 1

| Periodic Data | Pilot signal power information of eNodeB received by UE |
|---|---|
| | Signal-to-Interference plus Noise Ratio (SINR) information of DL traffic channel received by UE |
| | SINR information of UL traffic channel received by eNodeB |
| | UL power information allocated to UE |
| | Location information of UE |

TABLE 1-continued

| | |
|---|---|
| Environmental Data | Pilot signal power information transmitted by eNodeB Antenna configuration information of eNodeB (including azimuth and tilt information of antenna) |
| Event-Driven Data | Handover failure related information of UE Radio link failure related information of UE |

As shown in Table 1, the periodic data and the event-driven data include data collected from the UE 101 and data collected from the eNodeB 107.

The cell coverage monitoring unit 109 determines by using the periodic data, the event-driven data, and the environmental data whether a cell coverage is downscaled.

Figure 2:
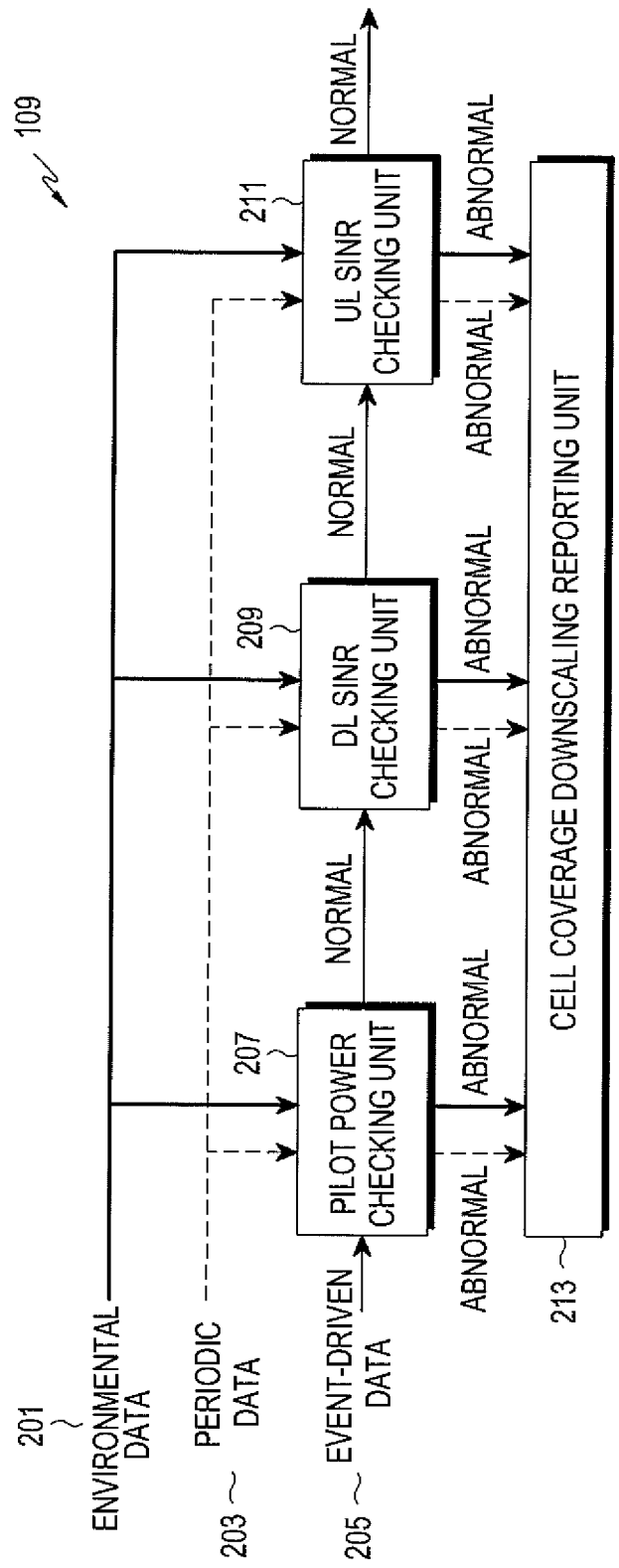
FIG. 2 is a block diagram of a cell coverage monitoring unit according to an embodiment of the present invention.

With reference to FIG. 2, a detailed description will now be made of the cell coverage monitoring unit 109.

FIG. 2 is a block diagram of the cell coverage monitoring unit 109 according to an embodiment of the present invention.

The cell coverage monitoring unit 109 includes a pilot power checking unit 207, a DL SINR checking unit 209, an UL SINR checking unit 211, and a cell coverage downscaling reporting unit 213.

The pilot power checking unit 207, the DL SINR checking unit 209, and the UL SINR checking unit 211 receive environmental data 201, periodic data 203, and event-driven data 205.

The environmental data 201 is related to a wireless network setting state, and is used to configure a channel model and a propagation model in a cell from the pilot power checking unit 207, the DL SINR checking unit 209, and the UL SINR checking unit 211.

The periodic data 203 is periodically collected from the UE and the eNodeB to be periodically input to the pilot power checking unit 207, the DL SINR checking unit 209, and the UL SINR checking unit 211. The pilot power checking unit 207, the DL SINR checking unit 209, and the UL SINR checking unit 211 periodically monitor a cell coverage by using the periodic data 203, and if the cell coverage is downscaled, they notify the cell coverage downscaling reporting unit 213 of the monitoring result.

The event-driven data 205 is sequentially input to the pilot power checking unit 207, the DL SINR checking unit 209, and the UL SINR checking unit upon occurrence of a particular event.

The pilot power checking unit 207 checks if a power of a pilot signal received by the UE falls within a reference power range to determine whether the cell coverage is downscaled.

The DL SINR checking unit 209 checks if an SINR of a DL traffic channel (hereinafter, referred to as 'DL SINR') in the UE falls within a reference DL SINR range to determine whether the cell coverage is downscaled.

The UL SINR checking unit 211 checks if an SINR of a UL traffic channel (hereinafter, referred to as 'UL SINR') in the eNodeB falls within a reference UL SINR range to determine whether the cell coverage is downscaled.

The pilot power checking unit 207, the DL SINR checking unit 209, and the UL SINR checking unit 211 notify the cell coverage downscaling reporting unit 213 that the cell coverage is downscaled, if they determine that the cell coverage is downscaled.

The cell coverage downscaling reporting unit 213 then checks if it is notified that the cell coverage is downscaled based on the pilot signal power check result, the DL SINR check result, and the UL SINR check result from the pilot power checking unit 207, the DL SINR checking unit 209, and the UL SINR checking unit 211, respectively, and combines the check results and reports them to an upper-level operator or manager.

Hereinafter, operations of the pilot power checking unit 207, the DL SINR checking unit 209, and the UL SINR checking unit 211 will be described in detail.

First, operations of the pilot power checking unit 207 will be described with reference to FIG. 3.

Figure 3:
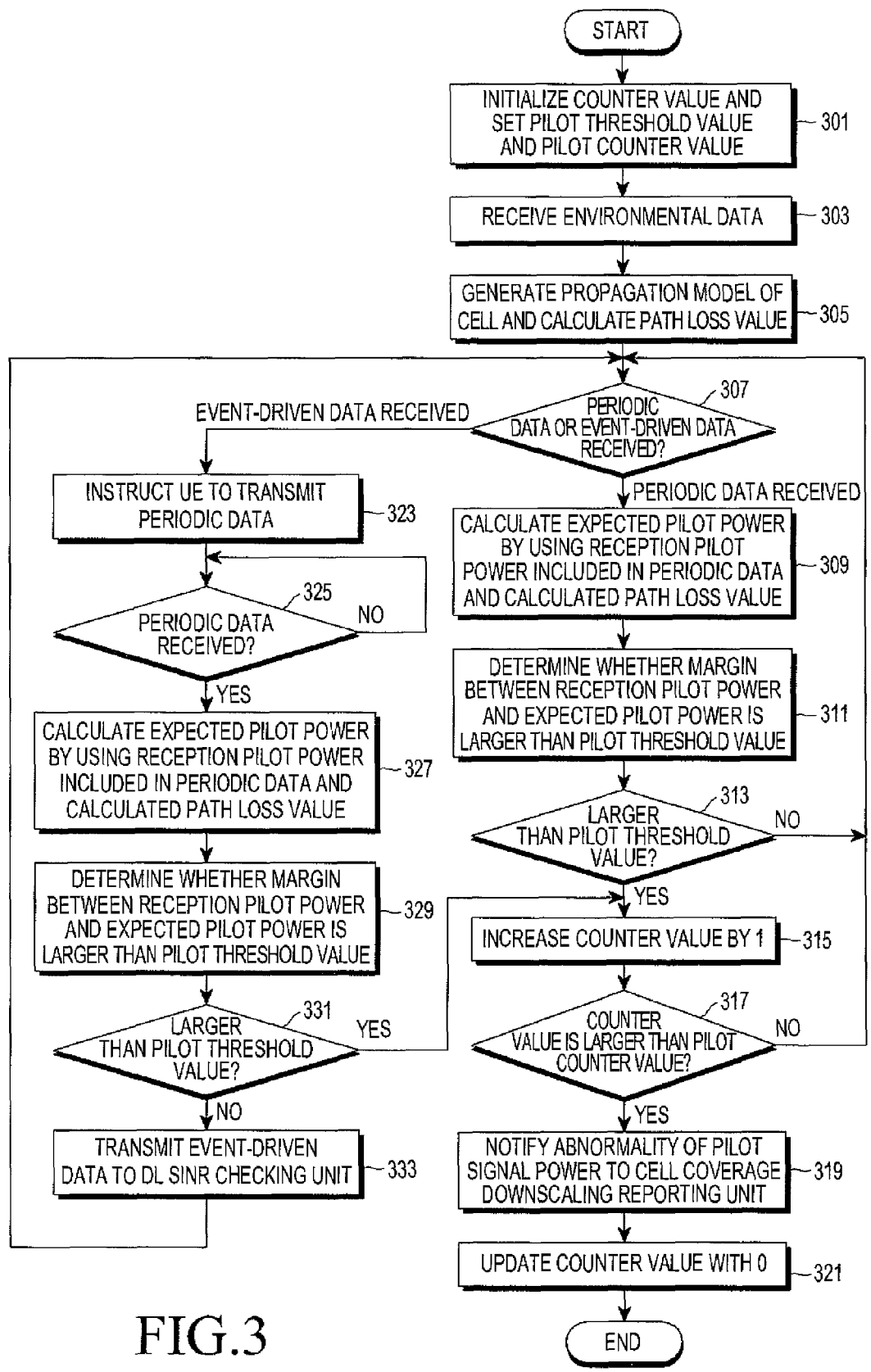
FIG. 3 is a flowchart illustrating an operating process of a pilot power checking unit according to an embodiment of the present invention.

FIG. 3 is a flowchart illustrating an operating process of the pilot power checking unit 207 according to an embodiment of the present invention.

In block 301, the pilot power checking unit 207 initializes a counter value and sets a pilot threshold value and a pilot counter value to be used for pilot signal power checking.

The counter value indicates the number of times a pilot signal power measured by the UE does not fall within a reference power range. The counter value may be set to 0 as an initial value.

The pilot threshold value indicates a maximum value of a margin between a power of a pilot signal transmitted by the eNodeB (hereinafter, referred to as 'transmission pilot power') and a power of a pilot signal received by the UE (hereinafter, referred to as 'reception pilot power'), which considers short-term fading. In other words, the pilot threshold value means a reference value for determining whether the transmission pilot power and the reception pilot power have a margin there-between to the extent that it does not affect communication between the eNodeB and the UE.

The pilot threshold value differs from cell to cell, and may be set based on statistics of a transmission pilot power and a reception pilot power through a drive test or an experiment. The pilot power checking unit 207 may determine that a power of a pilot signal in a cell is possibly abnormal when a margin between the transmission pilot power and the reception pilot power, which considers a path loss and a penetration loss, is larger than the pilot threshold value.

The pilot counter value indicates a maximum value of a counter value for determining that a power of a pilot signal in a cell is abnormal based on analyzed data. The pilot power checking unit 207 may determine that a power of a pilot signal in a cell is downscaled if the number of times a power of a pilot signal received by the UE, that is, a reception pilot power, is less than an expected pilot signal power is larger than the pilot counter value. The pilot counter value may be adjusted based on statistics corresponding to the pilot power checking result.

Once the pilot threshold value and the pilot counter value are set as described above, the pilot power checking unit 207 receives environmental data from the eNodeB in block 303. In pilot signal power checking, a power of a pilot signal transmitted from a cell transceiver, antenna configuration information, and cell location information indicating in which one of a dense urban, a urban, a suburban, and a rural a cell is located are used as the environmental data.

In block 305, the pilot power checking unit 207 generates a propagation model of the cell by using the environmental data and calculates a path loss value with respect to a point located apart from a center of the cell by a predetermined distance. The calculated path loss value is maintained until the environmental data is updated.

In block 307, the pilot power checking unit 207 determines whether periodic data or event-driven data is received.

If the periodic data is received, the pilot power checking unit 207 proceeds to block 309. In pilot signal power checking, a power of a pilot signal based on a location of the UE is used as the periodic data.

In block 309, the pilot power checking unit 207 calculates an expected pilot power to be actually measured by the UE by using the power of the pilot signal of the eNodeB received by the UE, which is included in the periodic data, that is, the reception pilot power, and the path loss value calculated in block 305. More specifically, the pilot power checking unit 207 calculates the expected pilot power by subtracting the path loss value from the reception pilot power.

In block 311, the pilot power checking unit 207 determines whether a margin between the reception pilot power and the expected pilot power is larger than the pilot threshold value. In block 313, the pilot power checking unit 207 goes to block 315 to increase the counter value by 1 if the margin between the reception pilot power and the expected pilot power is larger than the pilot threshold value.

If the margin between the reception pilot power and the expected pilot power is less than or equal to the pilot threshold value in block 313, the pilot power checking unit 207 goes back to block 307.

In block 317, the pilot power checking unit 207 determines whether the counter value is larger than the pilot counter value. If the counter value is not larger than the pilot counter value, the pilot power checking unit 207 goes back to block 307; if the counter value is larger than the pilot counter value, the pilot power checking unit 207 goes to block 319 and notifies the cell coverage downscaling reporting unit 213 that the pilot signal power is abnormal to indicate that the cell coverage is downscaled. Next, in block 321, the pilot power checking unit 207 updates the counter value with 0.

Meanwhile, if the pilot power checking unit 207 determines in block 307 that the event-driven data is received, the pilot power checking unit 207 goes to block 323 to instruct the UE to transmit the periodic data. If the periodic data is received from the UE in block 325, the pilot power checking unit 207 goes to block 327. Herein, a power of a pilot signal based on a location of the UE may be used as the periodic data.

In block 327, the pilot power checking unit 207 calculates an expected pilot power to be actually measured by the UE, by using the reception pilot power included in the periodic data and the path loss value calculated in block 305. More specifically, the pilot power checking unit 207 calculates the expected pilot power by subtracting the path loss value from the reception pilot power.

Next, in block 329, the pilot power checking unit 207 determines whether a margin between the reception pilot power and the expected pilot power is larger than the pilot threshold value. If the margin between the reception pilot power and the expected pilot power is larger than the pilot threshold value in block 331, the pilot power checking unit 207 goes to block 315. If the margin between the reception pilot power and the expected pilot power is smaller than or equal to the pilot threshold value in block 331, the pilot power checking unit 207 goes to block 333 to transmit the event-driven data to the DL SINR checking unit 209 and then goes back to block 307.

Next, operations of the DL SINR checking unit 209 will be described with reference to FIG. 4.

Figure 4:
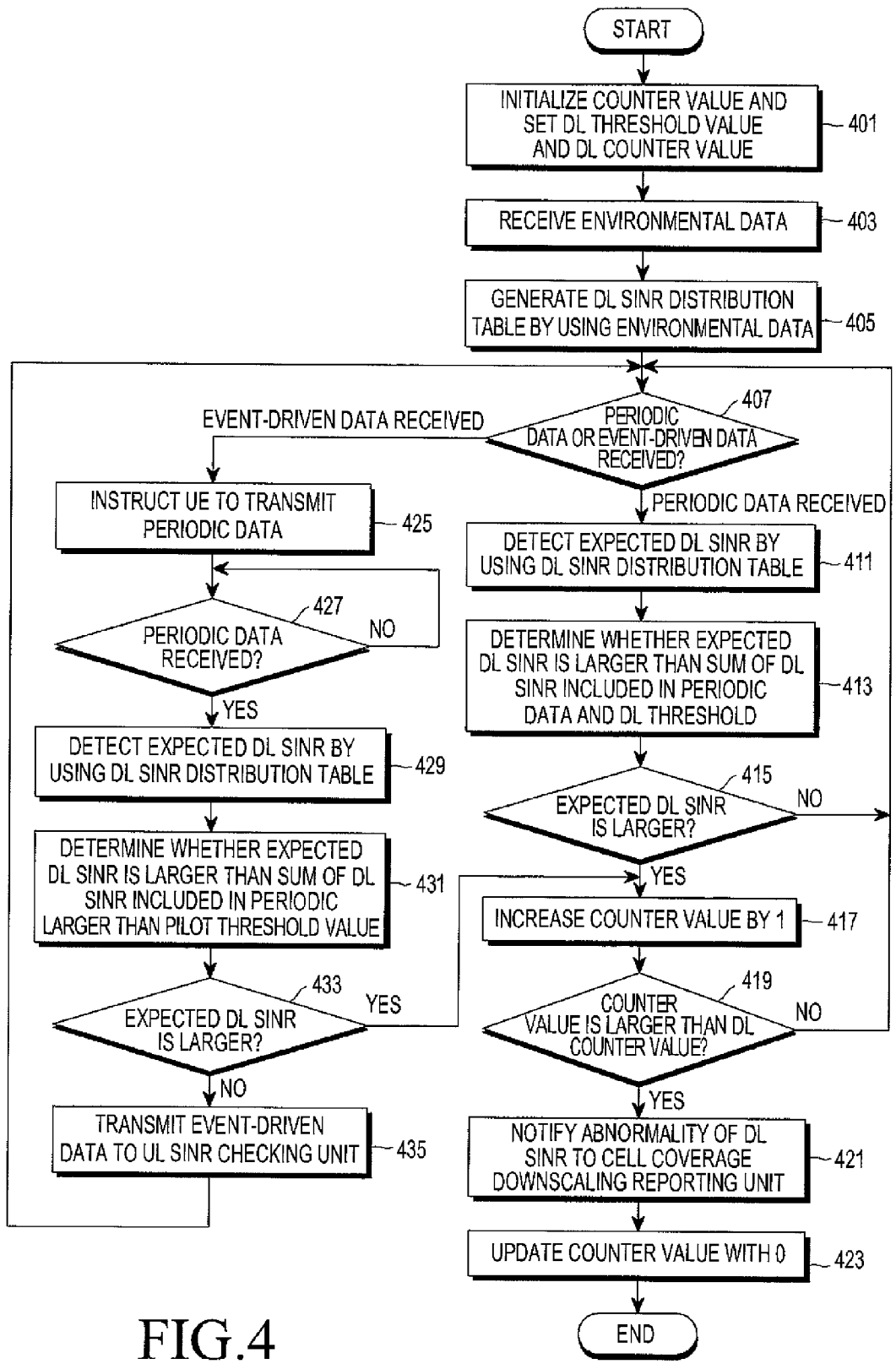
FIG. 4 is a flowchart illustrating an operating process of a DownLink (DL) Signal-to-Interference plus Noise Ratio (SINR) checking unit according to an embodiment of the present invention.

FIG. 4 is a flowchart illustrating an operating process of the DL SINR checking unit 209 according to an embodiment of the present invention.

The DL SINR checking unit 209 initializes a counter value used for DL SINR checking and sets a DL threshold value and a DL counter value in block 401.

The DL threshold value indicates a maximum value of a margin between a DL SINR of the UE expected by the eNodeB (hereinafter, referred to as 'expected DL SINR') and a DL SINR measured by the UE. In other words, the pilot threshold value means a reference value for determining whether the expected DL SINR and the DL SINR measured by the UE have a margin therebetween to the extent that it does not affect communication between the eNodeB and the UE.

The DL threshold value differs from cell to cell, and may be set based on statistics of the expected DL SINR or the DL SINR measured by the UE through the drive test or the experiment. The DL SINR checking unit 209 may determine that the DL SINR in a cell is possibly abnormal if the margin between the expected DL SINR and the DL SINR measured by the UE is larger than the DL threshold value.

The DL counter value indicates a maximum value of the counter value for determining that the DL SINR in a cell is abnormal based on the analyzed data. The DL SINR checking unit 209 may determine that the DL SINR in a cell is abnormal if the number of times the DL SINR measured by the UE is smaller than the expected DL SINR. The DL counter value may be adjusted based on statistics corresponding to the DL SINR checking result.

Once the DL threshold value and the DL counter value are set, the DL SINR checking unit 209 receives environmental data from the eNodeB in block 403. In DL SINR checking, a power of a pilot signal transmitted from a cell transceiver, antenna configuration information, and cell location information indicating in which one of a dense urban, a urban, a suburban, and a rural a cell is located are used as the environmental data.

In block 405, the DL SINR checking unit 209 generates a DL SINR distribution table indicating a distribution of DL SINRs according to a location of the UE in a cell by using the environmental data. The DL SINR distribution table is continuously used until the environmental data is updated.

In block 407, the DL SINR checking unit 209 determines whether periodic data or event-driven data is received.

If the periodic data is received, the DL SINR checking unit 209 goes to block 411. In DL SINR checking, location information of the UE and an SINR of a DL traffic channel received by the UE, that is, a DL SINR, are used as the periodic data.

The DL SINR checking unit 209 detects an expected DL SINR by using the DL SINR distribution table in block 411. In other words, the DL SINR checking unit detects a DL SINR corresponding to a location of the UE as the expected DL SINR from the DL SINR distribution table.

In block 413, the DL SINR checking unit 209 determines whether the expected DL SINR is larger than a sum of the DL SINR included in the periodic data, that is, the SINR of the DL traffic channel received by the UE, and the DL threshold.

If the expected DL SINR is larger than the sum of the DL SINR included in the periodic data and the DL threshold in block 415, the DL SINR checking unit 209 goes to block 417 to increase the counter value by 1. Herein, the counter value is different from the DL counter value and is a value for counting the number of times the expected DL SINR is larger than the sum of the DL SINR included in the periodic data and the DL threshold value.

If the expected DL SINR is smaller than or equal to the sum of the DL SINR included in the periodic data and the DL threshold in block 415, the DL SINR checking unit 209 goes back to block 407.

In block 419, the DL SINR checking unit 209 determines whether the counter value is larger than the DL counter value. The DL SINR checking unit 209 goes to block 421 if the counter value is larger than the DL counter value in block 419;

if the counter value is smaller than or equal to the DL counter value, the DL SINR checking unit 209 goes back to block 407.

In block 421, the DL SINR checking unit 209 notifies the cell coverage downscaling reporting unit 213 that the DL SINR is abnormal to indicate that the cell coverage is downscaled. In block 423, the DL SINR checking unit 209 updates the counter value with 0.

If the event-driven data is received in block 407, the DL SINR checking unit 209 determines whether the received event-driven data is intended for DL SINR checking. If the received event-driven data is intended for DL SINR checking, the DL SINR checking unit 209 goes to block 425 to instruct the UE to transmit the periodic data. If the periodic data is received in block 427, the DL SINR checking unit 209 goes to block 429. Herein, a DL SINR corresponding to a location of the UE may be used as the periodic data.

The DL SINR checking unit 209 detects an expected DL SINR by using the DL SINR distribution table in block 429. In block 431, the DL SINR checking unit 209 determines whether the expected DL SINR is larger than a sum of the DL SINR included in the periodic data and the DL threshold value.

If the expected DL SINR is larger than the sum of the DL SINR and the DL threshold in block 433, the DL SINR checking unit 209 goes to block 417 to perform subsequent processes.

If the expected DL SINR is smaller than or equal to the sum of the DL SINR and the DL threshold in block 433, the DL SINR checking unit 209 goes to block 435 to transmit the event-driven data to the UL SINR checking unit 211 and then goes back to block 407.

Next, operations of the UL SINR checking unit 211 will be described with reference to FIG. 5.

Figure 5:
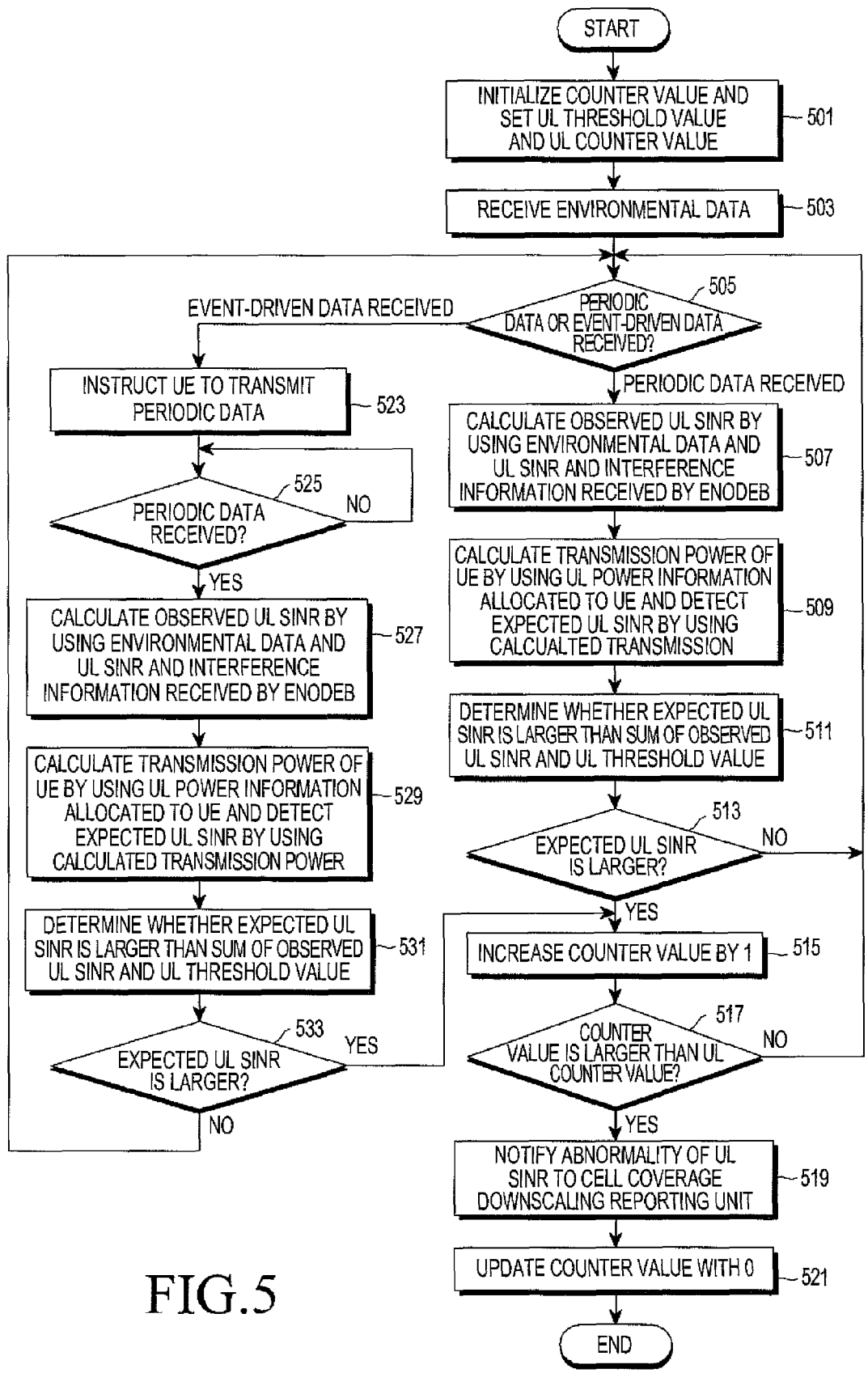
FIG. 5 is a flowchart illustrating an operating process of an UpLink (UL) Signal-to-Interference plus Noise Ratio (SINR) checking unit according to an embodiment of the present invention.

FIG. 5 is a flowchart illustrating an operating process of the UL SINR checking unit 211 according to an embodiment of the present invention.

The UL SINR checking unit 211 initializes a counter value used for UL SINR checking and sets a UL threshold value and a UL counter value in block 501.

The counter value indicates the number of times the UL SINR measured by the UE does not fall within a reference UL SINR range. The counter value may be set to 0 as an initial value.

The UL threshold value indicates a maximum value of a margin between an UL SINR expected by the eNodeB (hereinafter, referred to as 'expected UL SINR') and a UL SINR measured by the eNodeB. That is, the UL threshold value means a reference value for determining whether the expected UL SINR and the UL SINR measured by the eNodeB have a margin therebetween to the extent that it does not affect communication between the eNodeB and the UE.

The UL threshold value differs from cell to cell, and may be set based on statistics of the expected UL SINR or the UL SINR measured by the eNodeB through the drive test or the experiment. The UL SINR checking unit 211 may determine that the UL SINR in a cell is possibly abnormal if the margin between the expected UL SINR and the UL SINR measured by the eNodeB is larger than the UL threshold value.

The UL counter value indicates a maximum value of the counter value for determining that the UL SINR in a cell is abnormal based on the analyzed data. The UL SINR checking unit 211 may determine that the UL SINR in a cell is abnormal if the number of times the UL SINR measured by the eNodeB is smaller than the expected UL SINR. The UL counter value may be adjusted based on statistics corresponding to the UL SINR checking result.

Once the UL threshold value and the UL counter value are set, the UL SINR checking unit 211 receives environmental data from the eNodeB in block 503. In UL SINR checking, a power of a pilot signal transmitted from a cell transceiver, antenna configuration information, and cell location information indicating in which one of a dense urban, a urban, a suburban, and a rural a cell is located are used as the environmental data.

In block 505, the UL SINR checking unit 211 determines whether periodic data or event-driven data is received.

If the periodic data is received, the UL SINR checking unit 211 goes to block 507. Inn SINR checking, location information of the UE, UL power information allocated to the UE, and UL SINR and interference information received by the eNodeB are used as the periodic data.

In block 507, the UL SINR checking unit 211 calculates an observed UL SINR by using the environmental data and the UL SINR and interference information received by the eNodeB. In block 509, the UL SINR checking unit 211 calculates a transmission (Tx) power of the UE by using the UL power information allocated to the DE and detects an expected UL SINR by using the calculated Tx power.

In block 511, the UL SINR checking unit 211 determines whether the expected UL SINR is larger than a sum of the observed UL SINR and the UL threshold. If the expected UL SINR is larger than the sum of the observed UL SINR and the UL threshold in block 513, the UL SINR checking unit 211 goes to block 515 to increase the counter value by 1. Herein, the counter value is different from the UL counter value and is a value for counting the number of times the expected UL SINR is larger than the sum of the observed UL SINR and the UL threshold value.

If the expected UL SINR is smaller than or equal to the sum of the observed UL SINR and the UL threshold in block 513, the UL SINR checking unit 211 goes back to block 505.

In block 517, the UL SINR checking unit 211 determines whether the counter value is larger than the UL counter value. The UL SINR checking unit 211 goes to block 519 if the counter value is larger than the UL counter value in block 517; if the counter value is smaller than or equal to the UL counter value in block 517, the UL SINR checking unit 211 goes back to block 505.

In block 519, the UL SINR checking unit 211 notifies the cell coverage downscaling reporting unit 213 that the UL SINR is abnormal to indicate that the cell coverage is downscaled. In block 521, the UL SINR checking unit 211 updates the counter value with 0.

If the event-driven data is received in block 505, the UL SINR checking unit 211 determines whether the received event-driven data is intended for UL SINR checking. If the received event-driven data is intended for UL SINR checking, the UL SINR checking unit 211 goes to block 525 to instruct the UE to transmit the periodic data. If the periodic data is received in block 525, the UL SINR checking unit 211 goes to block 527. Herein, location information of the UE, UL power information allocated to the UE, and UL SINR and interference information received by the eNodeB may be used as the periodic data.

In block 527, the UL SINR checking unit 211 calculates the observed UL SINR by using the environmental data and the UL SINR and interference information received by the eNodeB. In block 529, the UL SINR checking unit 211 calculates a Tx power of the UE by using the UL power information allocated to the UE and detects the expected UL SINR by using the calculated Tx power.

In block 531, the UL SINR checking unit 211 determines whether the expected UL SINR is larger than a sum of the observed UL SINR and the UL threshold value. If the expected UL SINR is larger than the sum of the observed UL SINR and the UL threshold value in block 533, the UL SINR checking unit 211 goes to block 515 to perform subsequent operations. If the expected UL SINR is smaller than or equal to the sum of the observed UL SINR and the UL threshold value, the UL SINR checking unit 211 goes back to block 505.

As such, in the present invention, a pilot signal power, a DL SINR, and an UL SINR are checked by using environmental data, periodic data, and event-driven data collected by an eNodeB and a UE in a wireless communication system, thereby rapidly and accurately detecting whether a cell coverage is downscaled at low cost. Therefore, in the wireless communication system according to the present invention, it is possible to immediately detect whether a cell coverage is downscaled and to continuously provide a service to a UE without degradation in service quality.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting whether a cell coverage is downscaled in a wireless communication system, the method comprising:
    receiving information used for communication between an evolved NodeB (eNodeB) and a User Equipment (UE) from the eNodeB, the information being acquired by the eNodeB and the UE;
    performing, by using the received information, at least one of pilot signal power checking for checking if a pilot signal power falls within a first reference range, DownLink (DL) Signal-to-Interference plus Noise Ratio (SINR) checking for checking if an SINR of a DL traffic channel falls within a second reference range, and UpLink (UL) SINR checking for checking if an SINR of an UL traffic channel falls within a third reference range; and
    detecting whether a cell coverage of a cell to which the eNodeB and the UE belongs is downscaled, based on a checking result according to at least one of the pilot signal power checking, the DL SINR checking, the UL SINR checking.

2. The method of claim 1, wherein the information comprises at least one of environmental data comprising wireless network setting information, periodic data comprising information related to an UL signal and a DL signal, the periodic data being periodically acquired by the eNodeB and the UE, and event-driven data comprising information acquired by the eNodeB and the UE in association with a particular event in case of occurrence of the particular event.

3. The method of claim 2, wherein the environmental data comprises power information of a pilot signal transmitted by the eNodeB and antenna configuration information of the eNodeB comprising azimuth and tilt information.

4. The method of claim 2, wherein the periodic data comprises power information of a pilot signal of the eNodeB received by the UE, SINR information of the DL traffic channel received by the UE, SINR information of the UL traffic channel received by the eNodeB, UL signal power information allocated to the UE, and location information of the UE.

5. The method of claim 2, wherein the event-driven data comprises information related to a handover failure, as the particular event if the UE fails in a handover, and information related to a wireless link connection failure, as the particular event if the UE fails in connection of a wireless link for communication with the eNodeB.

6. The method of claim 2, wherein the pilot signal power checking comprises:
    initializing a first counter value indicating a number of times a power of a pilot signal measured by the UE does not fall within the first reference range;
    generating a propagation model of the cell by using the environmental data and calculating a path loss value with respect to a point spaced apart from a center of the cell by a predetermined distance; and
    upon receiving one of the periodic data and the event-driven data, checking if the power of the pilot signal measured by the UE falls within the first reference range by using the first counter value, the path loss value, and the received data.

7. The method of claim 6, wherein the checking if the power of the pilot signal measured by the UE falls within the first reference range comprises:
    upon receiving the periodic data, expecting a power of the pilot signal to be measured by the UE by using the power of the pilot signal received by the UE, included in the periodic data, and the calculated path loss value;
    if a margin between the power of the pilot signal received by the UE and the expected power of the pilot signal is larger than a threshold value, increasing the first counter value; and
    if the increased first counter value is larger than a predetermined counter value, detecting that the power of the pilot signal measured by the UE does not fall within the first reference range.

8. The method of claim 6, wherein the checking if the power of the pilot signal measured by the UE falls within the first reference range comprises:
    upon receiving the event-driven data, instructing the UE to transmit the periodic data;
    upon receiving the periodic data, expecting the power of the pilot signal to be measured by the UE by using the power of the pilot signal received by the UE, included in the periodic data, and the calculated path loss value;
    if a margin between the power of the pilot signal received by the UE and the expected power of the pilot signal is larger than a threshold value, increasing the first counter value;
    if the increased first counter value is larger than a predetermined counter value, detecting that the power of the pilot signal measured by the UE does not fall within the first reference range; and
    if the margin between the power of the pilot signal received by the UE and the expected power of the pilot signal is smaller than or equal to the threshold value, performing the DL SINR checking by using the event-driven data.

9. The method of claim 2, wherein the DL SINR checking comprises:
    initializing a second counter value indicating a number of times the SINR of the DL traffic channel measured by the UE does not fall within the second reference range;
    generating a DL SINR distribution table indicating a distribution of DL SINRs according to a location of the UE in the cell by using the environmental data; and
    upon receiving one of the periodic data and the event-driven data, checking if the SINR of the DL traffic channel falls within the second reference range by using the second counter value, the DL SINR distribution table, and the received data.

10. The method of claim 9, wherein the checking if the SINR of the DL traffic channel falls within the second reference range comprises:
upon receiving the periodic data, expecting an SINR of the DL traffic channel to be measured by the UE by using the DL SINR distribution table;
if a margin between the expected SINR and an SINR of a DL traffic channel included in the periodic data is larger than a threshold value, increasing the second counter value; and
if the increased second counter value is larger than a predetermined counter value, initializing the increased second counter value and detecting that the SINR of the DL traffic channel does not fall within the second reference range.

11. The method of claim 9, wherein the checking if the SINR of the DL traffic channel falls within the second reference range comprises:
upon receiving the event-driven data, instructing the UE to transmit the periodic data;
upon receiving the periodic data, expecting an SINR of the DL traffic channel to be measured by the UE by using the DL SINR distribution table;
if a margin between the expected SINR and an SINR of a DL traffic channel included in the periodic data is larger than a threshold value, increasing the second counter value;
if the increased second counter value is larger than a predetermined counter value, initializing the increased second counter value and detecting that the SINR of the DL traffic channel does not fall within the second reference range; and
if the margin between the expected SINR and the SINR of the DL traffic channel included in the periodic data is smaller than or equal to the threshold value, performing the UL SINR checking by using the event-driven data.

12. The method of claim 2, wherein the UL SINR checking comprises:
initializing a third counter value indicating a number of times the SINR of the UL traffic channel measured by the UE does not fall within the third reference range;
receiving the environmental data; and
upon receiving one of the periodic data and the event-driven data, checking if the SINR of the UL traffic channel falls within the third reference range by using the third counter value, the environmental data, and the received data.

13. The method of claim 12, wherein the checking if the SINR of the UL traffic channel falls within the third reference range comprises:
upon receiving the periodic data, calculating an SINR of a UL traffic channel to be observed by the UE by using the environmental data, and SINR information and interference information of the UL traffic channel received by the eNodeB, the SINR information and the interference information being included in the periodic data;
calculating a transmission power of the UE by using power information of an UL signal allocated to the UE and expecting an SINR of the UL traffic channel to be measured by the UE by using the calculated transmission power;
if a margin between the expected SINR and an SINR of a UL traffic channel included in the periodic data is larger than a threshold value, increasing the third counter value; and
if the increased third counter value is larger than a predetermined counter value, initializing the increased third counter value and detecting that the SINR of the UL traffic channel does not fall within the third reference range.

14. The method of claim 12, wherein the checking if the SINR of the UL traffic channel falls within the third reference range comprises:
upon receiving the event-driven data, instructing the UE to transmit the periodic data;
upon receiving the periodic data, calculating an SINR of a UL traffic channel to be observed by the UE by using the environmental data, and SINR information and interference information of the UL traffic channel received by the eNodeB, the SINR information and the interference information being included in the periodic data;
calculating a transmission power of the UE by using power information of an UL signal allocated to the UE and expecting an SINR of the UL traffic channel to be measured by the UE by using the calculated transmission power;
if a margin between the expected SINR and an SINR of a UL traffic channel included in the periodic data is larger than a threshold value, increasing the third counter value by 1; and
if the increased third counter value is larger than a predetermined counter value, initializing the increased third counter value and detecting that the SINR of the UL traffic channel does not fall within the third reference range.

15. An apparatus capable of detecting whether a cell coverage is downscaled in a wireless communication system, the apparatus comprising:
a pilot power checking unit configured to check, upon receiving information used for communication between an evolved NodeB (eNodeB) and a User Equipment (UE) from the eNodeB, if a pilot signal power falls within a first reference range by using the information, the information being acquired by the eNodeB and the UE;
a DownLink (DL) Signal-to-Interference plus Noise Ratio (SINR) checking unit configured to check if an SINR of a DL traffic channel falls within a second reference range by using the information;
a UpLink (UL) SINR checking unit configured to check if an SINR of an UL traffic channel falls within a third reference range by using the information; and
a cell coverage downscaling detecting unit configured to receive a checking result from at least one of the pilot power checking unit, the DL SINR checking unit, and the UL SINR checking unit, and detect whether a cell coverage of a cell to which the eNodeB and the UE belongs is downscaled, based on the checking result.

16. The apparatus of claim 15, wherein the information comprises at least one of environmental data comprising wireless network setting information, periodic data comprising information related to an UL signal and a DL signal, the periodic data being periodically acquired by the eNodeB and the UE, and event-driven data comprising information acquired by the eNodeB and the UE in association with a particular event in case of occurrence of the particular event.

17. The apparatus of claim 16, wherein environmental data comprises power information of a pilot signal transmitted by the eNodeB and antenna configuration information of the eNodeB comprising azimuth and tilt information.

18. The apparatus of claim 16, wherein the periodic data comprises power information of a pilot signal of the eNodeB received by the UE, SINR information of the DL traffic channel received by the UE, SINR information of the UL traffic channel received by the eNodeB, UL signal power information allocated to the UE, and location information of the UE.

19. The apparatus of claim 16, wherein the event-driven data comprises information related to a handover failure, as the particular event if the UE fails in a handover, and information related to a wireless link connection failure, as the particular event if the UE fails in connection of a wireless link for communication with the eNodeB.

20. The apparatus of claim 16, wherein the pilot power checking unit is configured to:
   initialize a first counter value indicating a number of times a power of a pilot signal measured by the UE does not fall within the first reference range;
   generate a propagation model of the cell by using the environmental data and calculate a path loss value with respect to a point spaced apart from a center of the cell by a predetermined distance; and
   upon receiving one of the periodic data and the event-driven data, check if the power of the pilot signal measured by the UE falls within the first reference range by using the first counter value, the path loss value, and the received data.

21. The apparatus of claim 20, wherein the pilot power checking unit is configured to:
   expect a power of the pilot signal to be measured by the UE by using the power of the pilot signal received by the UE, included in the periodic data, and the calculated path loss value, upon receiving the periodic data;
   increases the first counter value, if a margin between the power of the pilot signal received by the UE and the expected power of the pilot signal is larger than a threshold value; and
   detect that the power of the pilot signal measured by the UE does not fall within the first reference range, if the increased first counter value is larger than a predetermined counter value.

22. The apparatus of claim 20, wherein the pilot power checking unit is configured to:
   instruct the UE to transmit the periodic data upon receiving the event-driven data, upon receiving the periodic data, expect the power of the pilot signal to be measured by the UE by using the power of the pilot signal received by the UE, included in the periodic data, and the calculated path loss value;
   increase the first counter value, if a margin between the power of the pilot signal received by the UE and the expected power of the pilot signal is larger than a threshold value;
   detect that the power of the pilot signal measured by the UE does not fall within the first reference range, if the increased first counter value is larger than a predetermined counter value; and
   transmit the event-driven data to the DL SINR checking unit, if the margin between the power of the pilot signal received by the UE and the expected power of the pilot signal is smaller than or equal to the threshold value.

23. The apparatus of claim 16, wherein the DL SINR checking unit is configured to:
   initialize a second counter value indicating a number of times the SINR of the DL traffic channel measured by the UE does not fall within the second reference range;
   generate a DL SINR distribution table indicating a distribution of DL SINRs according to a location of the UE in the cell by using the environmental data; and
   upon receiving one of the periodic data and the event-driven data, check if the SINR of the DL traffic channel falls within the second reference range by using the second counter value, the DL SINR distribution table, and the received data.

24. The apparatus of claim 23, wherein the DL SINR checking unit is configured to:
   expect an SINR of the DL traffic channel to be measured by the UE by using the DL SINR distribution table upon receiving the periodic data;
   increase the second counter value, if a margin between the expected SINR and an SINR of a DL traffic channel included in the periodic data is larger than a threshold value; and
   initialize the increased second counter value and detect that the SINR of the DL traffic channel does not fall within the second reference range, if the increased second counter value is larger than a predetermined counter value.

25. The apparatus of claim 16, wherein the DL SINR checking unit is configured to:
   instruct the UE to transmit the periodic data upon receiving the event-driven data, expect an SINR of the DL traffic channel to be measured by the UE by using the DL SINR distribution table upon receiving the periodic data;
   increase the second counter value, if a margin between the expected SINR and an SINR of a DL traffic channel included in the periodic data is larger than a threshold value;
   initialize the increased second counter value and detect that the SINR of the DL traffic channel does not fall within the second reference range, if the increased second counter value is larger than a predetermined counter value; and
   transmit the event-driven data to the UL SINR checking unit, if the margin between the expected SINR and the SINR of the DL traffic channel included in the periodic data is smaller than or equal to the threshold value.

26. The apparatus of claim 16, wherein the UL SINR checking unit is configured to:
   initialize a third counter value indicating a number of times the SINR of the UL traffic channel measured by the UE does not fall within the third reference range;
   receive the environmental data; and
   check if the SINR of the UL traffic channel falls within the third reference range by using the third counter value, the environmental data, and the received data upon receiving one of the periodic data and the event-driven data.

27. The apparatus of claim 26, wherein the UL SINR checking unit is configured to:
   calculate an SINR of a UL traffic channel to be observed by the UE by using the environmental data, SINR information and interference information of the UL traffic channel received by the eNodeB, upon receiving the periodic data, the SINR information and the interference information being included in the periodic data;
   calculate a transmission power of the UE by using power information of an UL signal allocated to the UE and expecting an SINR of the UL traffic channel to be measured by the UE by using the calculated transmission power;
   increase the third counter value, if a margin between the expected SINR and an SINR of a UL traffic channel included in the periodic data is larger than a threshold value; and
   initialize the increased third counter value and detect that the SINR of the UL traffic channel does not fall within the third reference range if the third counter value is larger than a predetermined counter value.

28. The apparatus of claim 26, wherein the UL SINR checking unit is configured to:
- instruct the UE to transmit the periodic data upon receiving the event-driven data, calculates an SINR of a UL traffic channel to be observed by the UE by using the environmental data, and SINR information and interference information of the UL traffic channel received by the eNodeB, upon receiving the periodic data, the SINR information and the interference information being included in the periodic data,
- calculate a transmission power of the UE by using power information of an UL signal allocated to the UE and expects an SINR of the UL traffic channel to be measured by the UE by using the calculated transmission power;
- increase the third counter value, if a margin between the expected SINR and an SINR of a UL traffic channel included in the periodic data is larger than a threshold value; and
- initialize the increased third counter value and detect that the SINR of the UL traffic channel does not fall within the third reference range, if the increased third counter value is larger than a predetermined counter value.

* * * * *